US012051155B2

(12) United States Patent
Hajmohammadi et al.

(10) Patent No.: US 12,051,155 B2
(45) Date of Patent: Jul. 30, 2024

(54) METHODS AND SYSTEMS FOR 3D MODELING OF A HUMAN SUBJECT HAVING HAIR BASED ON 2D IMAGERY

(71) Applicant: Verizon Patent and Licensing Inc., Basking Ridge, NJ (US)

(72) Inventors: Solmaz Hajmohammadi, San Francisco, CA (US); Denny Breitenfeld, Florham Park, NJ (US); Ching-kit Chan, Los Angeles, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 123 days.

(21) Appl. No.: 17/682,966

(22) Filed: Feb. 28, 2022

(65) Prior Publication Data

US 2023/0274502 A1    Aug. 31, 2023

(51) Int. Cl.
*G06T 17/20*    (2006.01)
*G06T 7/73*    (2017.01)
*G06T 13/40*    (2011.01)

(52) U.S. Cl.
CPC ............ *G06T 17/20* (2013.01); *G06T 7/75* (2017.01); *G06T 13/40* (2013.01); *G06T 2207/20081* (2013.01); *G06T 2207/30196* (2013.01)

(58) Field of Classification Search
CPC ............ G06T 13/40; G06T 17/20; G06T 2207/20081; G06T 2207/20084; G06T 2207/30196
See application file for complete search history.

(56) References Cited

U.S. PATENT DOCUMENTS

2020/0175757 A1*   6/2020   Li ..................... G06T 15/00

FOREIGN PATENT DOCUMENTS

CN    111583384 A   *   8/2020   ........... G06N 3/0454
CN    113658326 A   *   11/2021

OTHER PUBLICATIONS

Chai, Menglei, et al. "Dynamic hair manipulation in images and videos." ACM Transactions on Graphics (TOG) 32.4 (2013): 1-8. (Year: 2013).*

Hu, Liwen, et al. "Avatar digitization from a single image for real-time rendering." ACM Transactions on Graphics (ToG) 36.6 (2017): 1-14. (Year: 2017).*

(Continued)

*Primary Examiner* — Diane M Wills

(57) ABSTRACT

An illustrative 3D modeling system generates a hair orientation image based on a 2D image depicting a human subject having hair. The hair orientation image includes semantic segmentation data indicating whether image elements of the hair orientation image depict the hair of the human subject or content other than the hair. The hair orientation image further includes hair flow data indicating a flow direction of the hair depicted by various image elements. Based on the hair orientation image, the 3D modeling system generates a 3D model of the hair of the human subject. The 3D modeling system then integrates the 3D model of the hair of the human subject with a 3D model of a body of the human subject. Corresponding methods and systems are also disclosed.

20 Claims, 10 Drawing Sheets

(56) References Cited

OTHER PUBLICATIONS

Zhang et al., "Hair-GAN: Recovering 3D hair structure from a single image using generative adversarial networks", Visual Informatics 3 (2019) 102-112 (Year: 2019).*

Caliskan, Akin, et al. "Multi-view consistency loss for improved single-image 3d reconstruction of clothed people." Proceedings of the Asian Conference on Computer Vision (Year: 2020).*

Chai, Menglei, et al. "Autohair: Fully automatic hair modeling from a single image." ACM Transactions on Graphics 35.4 (Year: 2016).*

* cited by examiner

METHODS AND SYSTEMS FOR 3D MODELING OF A HUMAN SUBJECT HAVING HAIR BASED ON 2D IMAGERY

BACKGROUND INFORMATION

It is desirable to model three-dimensional (3D) subjects for a variety of entertainment, educational, occupational, promotional, and/or other applications and use cases. For example, by modeling 3D subjects such as people, furnishings, walls, floors, and ceilings in a real-world room, virtual reality content associated with the real-world room may be generated and provided as a virtual reality experience to a user located somewhere other than the real-world room. As another example, 3D models of subjects such as human subjects, animal subjects, inanimate objects, or the like, may be used to provide an augmented reality experience for a user in which the 3D models are inserted as augmentations into the user's real-world environment to make it appear as if these subjects are present where they are not actually present. In still other applications, 3D models may be presented as part of social networking applications, video games, film special effects, educational materials, and so forth.

For any of these applications or use cases, it is desirable for the 3D modeling to be performed accurately so as to result in 3D models that represent subjects as realistically as possible. Such true-to-life 3D modeling may cause the applications leveraging the 3D models to be realistic, lifelike, immersive, and enjoyable for users experiencing the applications.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
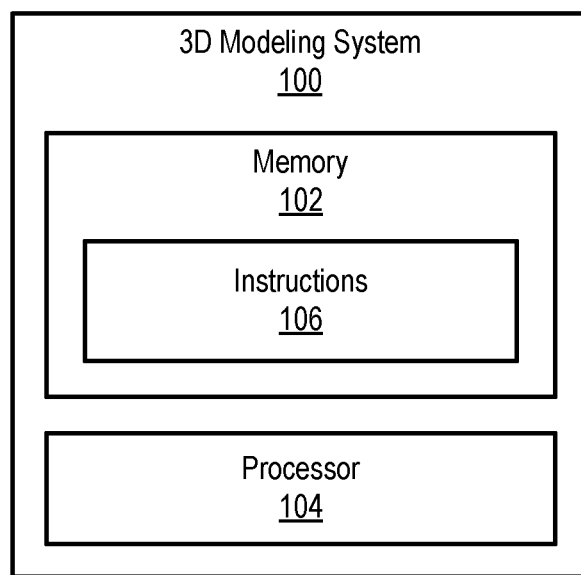
FIG. 1 shows an illustrative 3D modeling system for 3D modeling of a human subject having hair based on 2D imagery.

Methods and systems for three-dimensional (3D) modeling of a human subject having hair based on two-dimensional (2D) imagery are described herein. Various approaches have been employed conventionally to generate 3D volumetric models of subjects such as human subjects. For example, one approach may rely on data captured from various image capture devices (e.g., cameras) disposed at vantage points surrounding the subject that is to be modeled. Based on color and depth data that is captured by these capture devices, the 3D model in this approach may be formed based on the geometry and appearance of the subject as observed from the vantage points around the subject. In another example approach involving less image data and/or fewer image capture devices, a machine learning model trained to model, for example, the basic human form, may be used in connection with a small number of 2D images (e.g., as few as one 2D image) depicting the human subject from limited vantage points (e.g., as few as one vantage point or a small number of vantage points that do not necessarily surround the human subject on all sides). Based on the 2D image or images and the information embodied by the machine learning model, this type of approach may create a 3D model of a human subject that may not be as accurate as the model described above to be generated based on color and depth data captured from all angles, but may be suitable for various applications and, advantageously, may be generated based on much less image information about the human subject.

In both of these approaches, the hair of the human subject being modeled has conventionally been treated the same way as the rest of the body, clothes, and so forth. That is, the hair is either modeled based on image and depth capture from various angles or based on the machine learning model that has been trained on the human form and various poses that the human body may take. Unfortunately, hair modeled in accordance with either of these or other conventional techniques has tended to lack realism and behave unnaturally, thereby detracting from immersive 3D modeling of the human subject in various respects. These limitations arise from the fact that hair, and the many styles of human hair in particular, may vary in pose and character much more significantly than, for example, the human form and/or other simpler types of subjects. Indeed, different hair lengths, types, textures, colors, and ways of styling the hair may create complexity and potential variance from subject to subject that is not adequately addressed when the hair is modeled together with (e.g., in the same way as, using the same modeling techniques and/or machine learning models as) other parts of the body.

Accordingly, methods and systems described herein address these challenges by modeling the hair of a human subject separately from (e.g., in parallel with) the 3D modeling of the rest of the body using techniques, approaches, data, tools (e.g., machine learning models, etc.), and so forth, that are specifically customized for human hair, such as for hairstyles known to exist or be common among the population. Various suitable 3D modeling techniques, including data-driven deep learning approaches using machine learning models explicitly trained to handle a wide variety of human hairstyles encountered among a population, may be employed to generate or reconstruct a 3D hair model based on 2D imagery of a subject having hair (e.g., one or more 2D images depicting the subject from one or more vantage points, 2D video capture comprising one or more frame sequences depicting the subject from one or more vantage points, etc.). The 3D model of the hair may then be combined with a 3D model of the body that is generated separately (e.g., in any suitable way such by the approaches described above) to form an integrated model of the human subject. The 3D model of the body will be understood to include a remainder of the subject, other than the hair, that is visible in the 2D image and/or that is to be made visible for the presentation of the final integrated 3D model of the subject. For example, the 3D model of the body may comprise the entire body other than the hair (including the head, neck, torso, arms, legs, clothes, etc.) or a visible portion of the body such as from the torso up to, but not including, the hair (e.g., for a subject sitting behind a desk who is not visible from the waist down, etc.).

Various advantages and benefits may be provided by methods and systems described herein for 3D modeling of a human subject having hair based on 2D imagery. For example, as compared to modeling using conventional techniques, the 3D modeling principles described herein result in overall integrated models that provide more realistic and personalized 3D human avatars or models, particularly with respect to the appearance and behavior of the hair, which may appear far more natural, lifelike, and realistic-looking when modeled separately in accordance with principles described herein. The realism of the hair may help improve the quality and/or immersiveness of any application involving the integrated model. For instance, the integrated 3D model of the human subject may be animated to perform certain desirable behaviors, including behaviors that the subject may not have performed or may not be able or inclined to perform (e.g., professional dance moves, action stunt moves, etc.) without stiff, unrealistic, and/or plastic-like hair detracting from the visual effect. As a result, various useful animation, entertainment, educational, vocational, communication, and/or other applications may be implemented and deployed using methods and systems described herein.

Various specific implementations will now be described in detail with reference to the figures. It will be understood that the specific implementations described below are provided as non-limiting examples and may be applied in various situations. Additionally, it will be understood that other examples not explicitly described herein may also be captured by the scope of the claims set forth below. Methods and systems described herein for 3D modeling of a human subject having hair based on 2D imagery may provide any of the benefits mentioned above, as well as various additional and/or alternative benefits that will be described and/or made apparent below.

FIG. 1 shows an illustrative 3D modeling system 100 ("system 100") for 3D modeling of a human subject having hair based on 2D imagery (e.g., one or more still images, one or more videos, etc.). System 100 may be implemented by computer resources such as processors, memory facilities, storage facilities, communication interfaces, and so forth. For example, as will be described in more detail below, system 100 may be partially or fully implemented within graphics presentation devices used by end users (e.g., user equipment (UE) devices, head-mounted or hand-held extended reality presentation devices, mobile devices such as smartphones or tablet devices, personal computers, or other equipment used directly by end users); by server-side, multi-access computing systems separate from the graphics presentation devices; by a combination of any of these; or by any other suitable computing systems as may serve a particular implementation. In some examples, at least part of system 100 may be implemented by distributed computing systems operated by a cellular data provider (e.g., multi-access edge compute (MEC) systems), distributed computing systems operated by a cloud-computing provider (e.g., multi-access cloud compute systems), or by other such distributed computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with 3D modeling of a human subject having hair based on 2D imagery in accordance with methods and systems described herein and/or as may serve a particular implementation.

Figure 2:
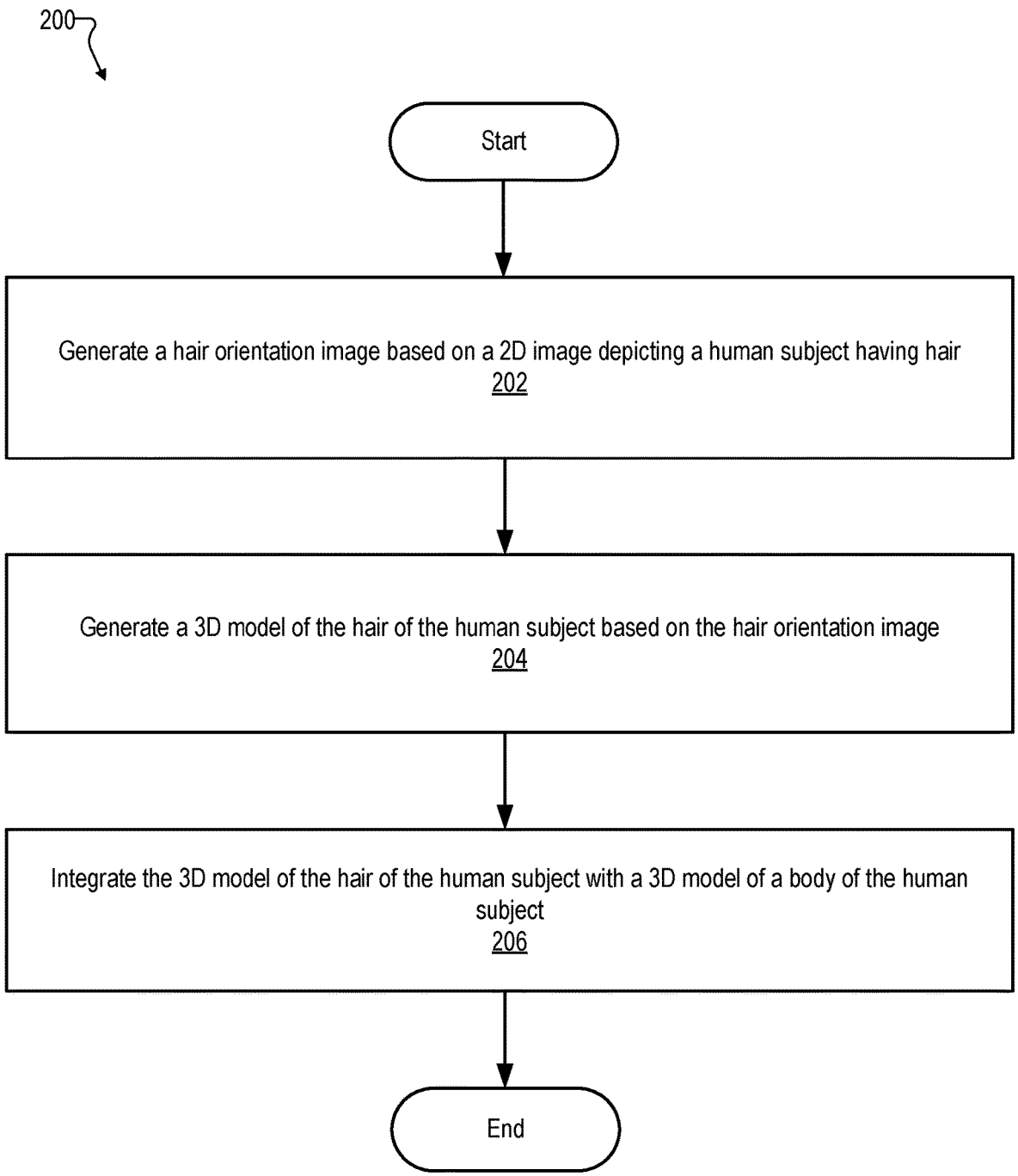
FIG. 2 shows an illustrative method for 3D modeling of a human subject having hair based on 2D imagery.

As one example of functionality that processor 104 may perform, FIG. 2 shows an illustrative method 200 for 3D modeling of a human subject having hair based on 2D imagery. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a 3D modeling system such as system 100 and/or any implementation thereof.

In certain examples, 3D modeling operations of method 200 may be performed efficiently and quickly, but, prioritizing the realism and quality of the resulting 3D models, may not necessarily be performed in real time. In other examples, 3D modeling operations of method 200 may be performed in real time so as to provide, receive, process, and/or use data described herein immediately as the data is generated, updated, changed, exchanged, or otherwise becomes available (e.g., generating the 3D model of the human subject as 2D video of the human subject is being captured). Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by an implementation of system 100 (e.g., by processor 104 executing instructions 106 stored in memory 102).

At operation 202, system 100 may generate a hair orientation image based on a 2D image depicting a human subject having hair. The 2D image may be implemented as a single still image (e.g., a photograph, etc.) or as a frame of a video. As such, the 2D image may be captured by an image capture device implemented by a still camera, a video camera, or the like. The image capture device may be implemented as a standalone device or may be integrated with another device (e.g., a camera integrated with a mobile device that will be used to present the 3D model that is ultimately generated, etc.). While a single 2D image is used in this example, it will be understood that, in certain implementations, a plurality of hair orientation images may be generated based on 2D imagery that includes a plurality of 2D images. For example, the plurality of 2D images may be a plurality of still images captured from different vantage points to depict the human subject (and his or her hair) with different perspectives, a video made up of a sequence of individual frames, a plurality of videos, or another suitable set of multiple 2D images.

As will be described and illustrated in more detail below, the hair orientation image may be made up of a plurality of image elements such as pixels, groupings of pixels, or other such elements that collectively form the image. For each of the plurality of image elements, the hair orientation image generated at operation 202 may include semantic segmentation data indicating whether the image element depicts the hair of the human subject or content other than the hair. Pixels (or other image elements) that depict part of the hair may be associated with a semantic segmentation bit having a first value (e.g., a logical "true" value such as a '1'), for example, while pixels (or other image elements) that depict things other than the hair (e.g., other parts of the body of the human subject, other objects besides the human subject, background scenery surrounding the human subject, etc.) may be associated with a semantic segmentation bit having a second value (e.g., a logical "false" value such as a '0').

In addition to the semantic segmentation data, each image element indicated by the semantic segmentation data to depict the hair (e.g., each pixel element associated with a semantic segmentation bit having the first value) may further be associated with hair flow data. Hair flow data included within the hair orientation image generated at operation 202 may be configured to indicate, with respect to a 2D coordinate space of the hair orientation image, a flow direction of the hair depicted by the image element. For example, one pixel helping depict a section of hair flowing in a vertical direction with respect to the image's 2D coordinate space may be associated with hair flow data indicating this in any suitable way (e.g., by having a pixel color or other suitable property that corresponds to the vertical direction of the image's 2D coordinate space). Meanwhile, another pixel helping depict a second section of hair flowing in a horizontal direction in the 2D image may be associated with hair flow data indicating this in a similar way (e.g., by having a pixel color or other property that corresponds to the horizontal direction of the 2D image's coordinate space).

At operation 204, system 100 may generate a 3D model of the hair of the human subject. For example, the 3D model may be generated based on the original 2D image, the hair orientation image generated at operation 202, and/or any other data as may be available to system 100 (e.g., a machine learning model incorporating data representing many different hair types and styles, etc.). As will be described in more detail below, the 3D model of the hair generated at operation 204 may be created in multiple phases. For instance, a voxelized representation of the hair may be generated first, based on a custom machine learning model trained on various hairstyles and based on the hair orientation image. A mesh representation of the hair may be generated based on this voxelized representation. The mesh representation may then undergo further post-processing or other conversion to ultimately generate the 3D model of the hair that is output by operation 204.

At operation 206, system 100 may integrate the 3D model of the hair of the human subject (generated at operation 204) with a 3D model of a body of the human subject. As mentioned above, the 3D model of the body may represent various parts of the human subject other than the hair, and, in certain examples, the body will be understood to represent all parts of the human subject other than the hair (e.g., including parts of the head not covered by hair, the neck and torso, the arms and legs, the clothing of the subject, personal effects such as items held in the subject's hands, and so forth). The 3D model of the body may be generated by system 100 or by another system or process (e.g., a system or process operating in parallel to system 100). When both the 3D model of the hair and the 3D model of the body are generated, operation 206 may involve combining these separate 3D models to form a single, integrated 3D model representative of an entirety of the human subject (with both hair and body).

As will be described in more detail below, the integrated 3D model may then be used as a model in any suitable application or use case (e.g., as an avatar in a game, extended reality application, social communication application, or the like). In certain use cases, the integrated 3D model of the human subject formed by the integrating, at operation 206, of the 3D model of the hair with the 3D model of the body may be used to create an animation. For example, system 100 may animate, based on an animation of an additional human subject different from the human subject, the integrated 3D model of the human subject to mimic the animation of the additional human subject. In this way, if the additional human subject performs a dance or a stunt or other action that the human subject has not performed (e.g., is not able or willing to perform, etc.), the integrated 3D model of the human subject may be made to perform the action (i.e., the dance, stunt, etc.) based on the actions of the additional human subject and without the human subject having to perform the action himself or herself.

Figure 3:
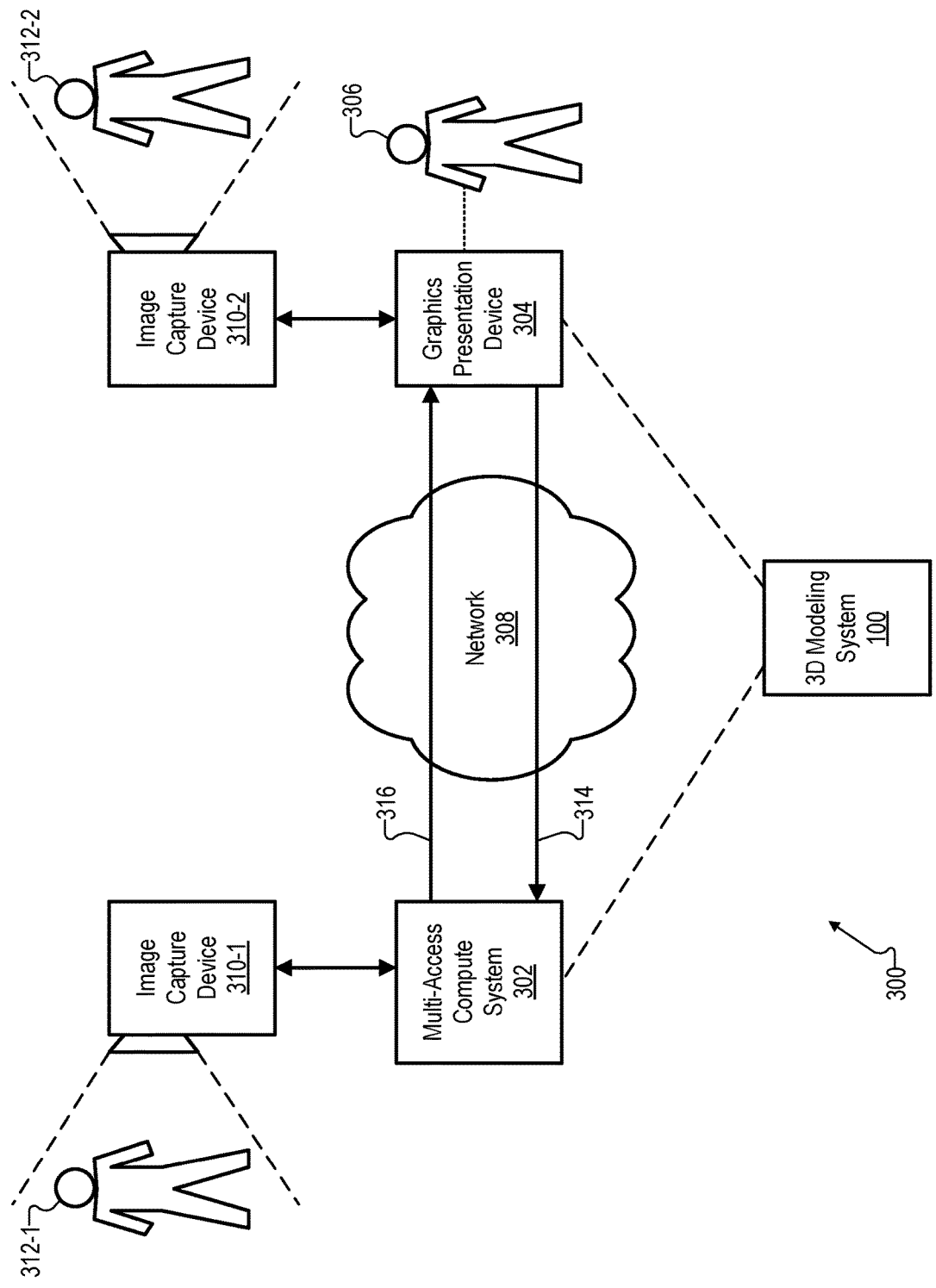
FIG. 3 shows an illustrative configuration in which a 3D modeling system may be deployed.

FIG. 3 shows an illustrative configuration 300 in which 3D modeling system 100 may be deployed. For example, as illustrated with dashed lines in configuration 300, system 100 may be implemented by a multi-access compute system 302, a graphics presentation device 304 operated by a user 306 (e.g., an end user), or by a combination of one or more of these devices and/or other suitable devices (not explicitly shown in FIG. 3). As shown in FIG. 3, a network 308 may provide a communicative fabric by way of which various computing systems and devices (e.g., including whichever devices implement part or all of system 100) may intercommunicate and interoperate with one another. For example, multi-access compute system 302 and graphics presentation device 304 are shown to be communicatively coupled to one another by way of network 308 in configuration 300.

Multi-access compute system 302 may represent any computing system accessible by network 308 and configured to provide computing services to a plurality of client devices such as graphics presentation device 304. In certain examples, multi-access compute system 302 may be implemented by a multi-access edge compute (MEC) system provided and maintained by a data services provider such as a wireless carrier managing a provider network incorporated within network 308. In other examples, multi-access compute system 302 may be implemented by a multi-access cloud compute system and/or another distributed computing system as may be implemented within network 308 or as may be communicatively coupled to network 308 in a particular implementation.

In implementations in which system 100 is implemented by multi-access compute system 302, one or more 2D images may be captured and provided to system 100 by an image capture device 310-1 communicatively coupled to multi-access compute system 302. Such 2D images may depict any of various scenes, objects, and/or other subjects, including a human subject 312-1. Image capture device 310-1 may be implemented by any suitable image capture device such as a still camera, a video camera, a set of cameras pre-arranged to capture a scene in which human subject 312-1 is present, or the like. In these implementations, a communication 314 from graphics presentation device 304 to multi-access compute system 302 may represent a request for data, such as a request for a 3D model of human subject 312-1 or a request for content (e.g., extended reality content, 3D video content, etc.) that incorporates a 3D model of human subject 312-1 that is generated by the implementation of system 100 implemented by multi-access compute system 302. A communication 316 from multi-access compute system 302 to graphics presentation device 304 may then represent the response to that request, and may include data representative of the requested 3D model or content. In certain examples, rather than capturing the 2D imagery using image capture device 310-1, multi-access compute system 302 may receive one or more 2D images from graphics presentation device 304 (e.g., as part of communication 314) and may generate the 3D model and/or requested content based on those one or more 2D images received from graphics presentation device 304.

Graphics presentation device 304 may be implemented by any suitable device used by user 306 to view graphics such as a rendering of a 3D model of a human subject and/or other subjects (e.g., other human subjects, objects at the scene, etc.). For example, as mentioned above, in implementations in which system 100 is implemented by multi-access compute system 302, graphics presentation device 304 may request an integrated 3D model of a human subject (or content incorporating such a model) by way of communication 314 and may receive data representing the integrated 3D model by way of communication 316. In other implementations in which system 100 is implemented by graphics presentation device 304 itself, graphics presentation device 304 may receive a 2D image from an image capture device 310-2 (e.g., an integrated capture device built into graphics presentation device 304 such as a smartphone camera, a local capture device communicatively coupled to graphics presentation device 304 such as a video camera connected to a laptop computer, etc.) that captures the 2D image depicting a human subject 312-2. The implementation of system 100 implemented by graphics presentation device 304 may generate an integrated 3D model of human subject 312-2 in these examples with or without assistance from multi-access compute system 302. In certain such implementations, graphics presentation device 304 may operate in a stand-alone fashion, unconnected from network 308 and any multi-access compute system such as multi-access compute system 302.

Graphics presentation device 304 may present graphics such as integrated 3D models described herein from arbitrary viewpoints selected by user 306. To this end, graphics presentation device 304 may be implemented by various types of devices that are capable of displaying graphical imagery to users. For instance, graphics presentation device 304 could be implemented as (or included within) a computing system such as a mobile device (e.g., a smartphone, a tablet computing device, etc.), a dedicated virtual reality or augmented reality presentation device (e.g., a head-mounted device configured to display graphics directly in front of each eye of user 306), a portable or stationary computing device (e.g., a personal desktop or laptop computer, etc.), a television device, or any other system or device as may serve a particular implementation. In some examples, graphics presentation device 304 may include one or more display screens (e.g., traditional display screens, partially transparent heads-up display (HUD) screens, computer monitors, etc.) configured to display frames rendered by graphics presentation device 304 itself or by server-side systems such as multi-access compute system 302.

User 306 may represent any person who views graphical representations presented by graphics presentation device 304, and will be understood to typically have at least some degree of control over what graphics presentation device 304 displays. For example, if graphics presentation device 304 is implemented as an augmented or virtual reality presentation device, user 306 may move graphics presentation device 304 with respect to a virtual scene being presented and may, in this way, control the viewpoint from which the virtual or augmented reality experience is provided. User 306 is illustrated as a separate person from human subject 312-2 and, in some examples, may indeed be separate and distinct from the human subject being captured by image capture device 310-2 to be modeled by system 100. For instance, a user of a smartphone device (implementing graphics presentation device 304) that includes an integrated camera (implementing image capture device 310-2) may use the smartphone camera to capture images of a friend (human subject 312-2) that is to be modeled by an implementation of system 100 integrated with either graphics presentation device 304 or multi-access compute system 302 (or distributed between these two computing devices). In other examples, user 306 may actually be the same as human subject 312-2. For instance, user 306 may use the smartphone described above to take a selfie image that is used as the 2D image on which the integrated 3D model is based.

Network 308 may be implemented by any suitable private or public networks as may serve a particular implementation. For instance, part of network 308 may be implemented by a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). The provider of such a provider network may own or control all of the elements necessary to sell and deliver communications services between multi-access compute system 302, one or more graphics presentation devices 304 (only one of which is explicitly shown in configuration 300), and/or other computing devices connected to the network. Such communications services may include radio spectrum allocation, wireless network infrastructure, provisioning of devices, network repair, and so forth.

In some examples, other networks not controlled by the provider may also be included within network 308. For example, external network infrastructure may include the Internet, one or more wide area networks or local area networks to which graphics presentation device 304 is connected, a content delivery network, and/or any other suitable network or networks managed by any third parties outside of the control of the provider of the provider system described above. The network elements associated with network 308 may implement or employ any suitable communication technologies, devices, media, protocols, or the like as may serve a particular implementation.

Communications 314 and 316 between multi-access compute system 302 and graphics presentation device 304 may represent any communications of requests, responses, 2D images, 3D models, and/or other suitable data as may be useful to communicate in a given implementation (e.g., based on whether system 100 is implemented within multi-access compute system 302, within graphics presentation device 304, within both of these, etc.). As one possibility mentioned above, for instance, communication 314 may include a request for 3D content and communication 316 may include an integrated 3D model of human subject 312-1 that is generated based on 2D imagery captured by image capture device 310-1. Another possibility is that communication 314 may include, along with a request for 3D content, one or more 2D images (e.g., a 2D video, several snapshots, etc.) that is to be used as a basis for the integrated 3D model to be provided by way of communication 316. For instance, the 2D image may depict human subject 312-2 as captured by image capture device 310-2, and the integrated 3D model may be returned as a standalone model or as part of other 3D content (e.g., a virtual reality world featuring a 3D representation of human subject 312-2, etc.). As yet another possibility, graphics presentation device 304 (and an instance of system 100 implemented therein) may generate an integrated 3D model (e.g., of human subject 312-2 as captured by image capture device 310-2, etc.) such that communication 314 may include the 3D model itself. In this example, then, communication 316 may include other 3D content that features the 3D model (e.g., extended reality content featuring the 3D model, a 3D world associated with video game or movie content featuring the 3D model, etc.) along with, in some cases, other 3D models (e.g., models received from other graphics presentation devices 304 not explicitly shown in configuration 300, etc.). These specific instances of possible communications 314 and 316 are to be regarded as illustrative examples only and are not to be understood to limit the ways in which 3D models may be generated or the various applications for which such 3D models may be used.

Figure 4:
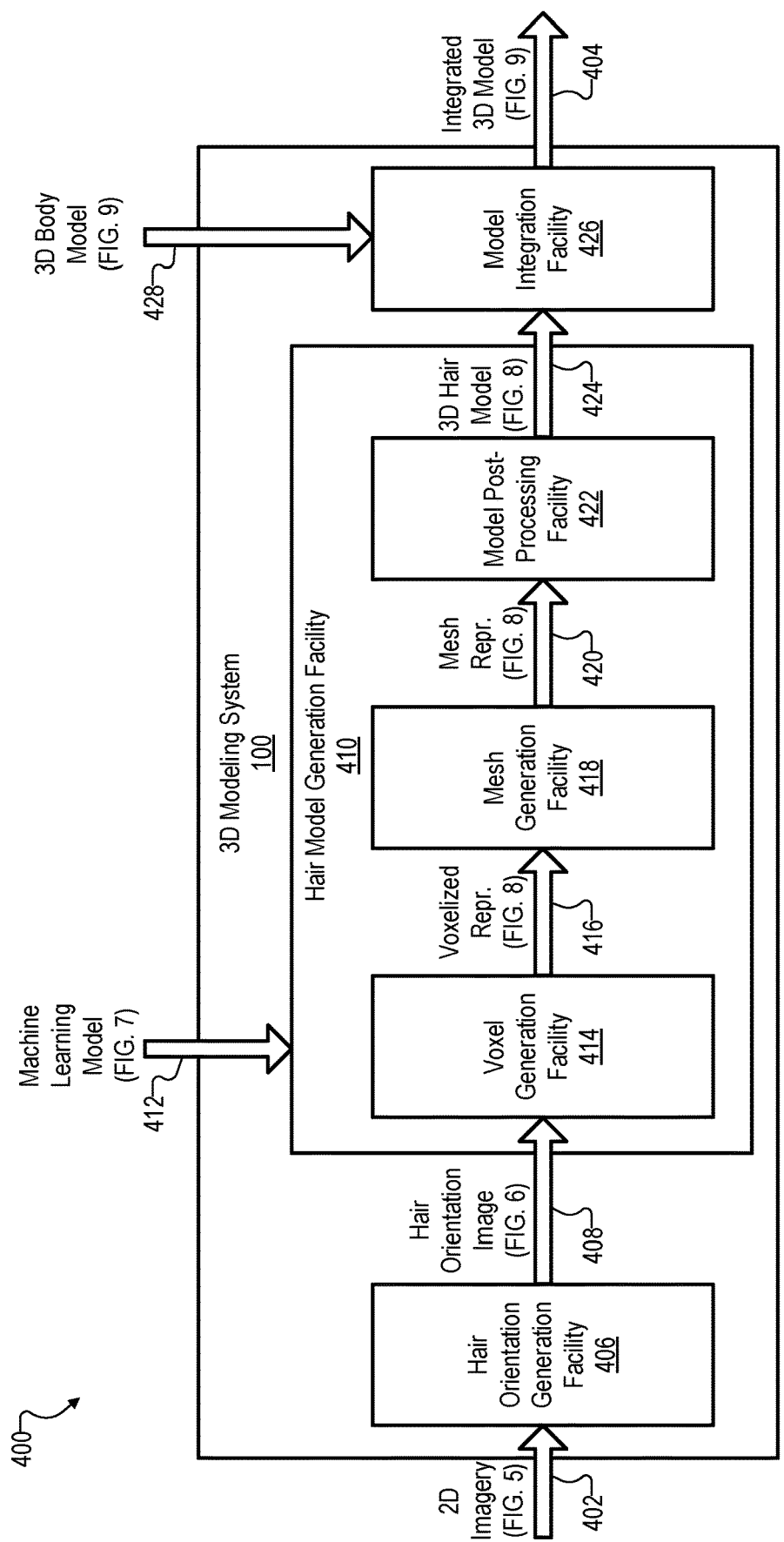
FIG. 4 shows illustrative facilities implemented by an example 3D modeling system and configured collectively to perform the 3D modeling of a human subject having hair based on 2D imagery.

FIG. 4 shows an illustrative implementation 400 of 3D modeling system 100. As shown, implementation 400 includes various illustrative facilities that are configured, collectively, to perform the 3D modeling of a human subject having hair based on 2D imagery (e.g., to perform the operations of method 200 and/or other operations described herein). The facilities of implementation 400 of system 100 will be understood to be implemented by computer hardware and software resources in any suitable way. For instance, each facility may represent software executing on a shared processor (e.g., an implementation of processor 104 that executes software associated with all of the facilities) to perform the operations described to be performed by that facility. As another example, each facility may be performed by a separate processor or even a separate computing system (e.g., a separate server, container, etc., in a multi-access computing environment). Collectively, the facilities of implementation 400 form a pipeline in which data representative of 2D imagery 402 (i.e., data representing one or more still images or video frame sequences as described herein) is received as input to the 3D modeling system, each internal facility receives and processes input data and provides output data to the subsequent facility, and an integrated 3D model 404 is ultimately provided by the 3D modeling system as output (e.g., for graphical presentation by a device such as graphics presentation device 304 in any of the applications described herein).

More specifically, as shown, a hair orientation generation facility 406 may receive 2D imagery 402 and may use it to generate a hair orientation image 408. A hair model generation facility 410 may then receive hair orientation image 408 along with a machine learning model 412 and may use these to generate a 3D model of the hair of the human subject depicted in 2D imagery 402. In the illustrated example, hair model generation facility 410 is shown to incorporate several sub-facilities that assist facility 410 in generating the 3D hair model. Specifically, as shown, a voxel generation facility 414 may receive hair orientation image 408 and, based on machine learning model 412, may generate a voxelized representation 416 of the hair. A mesh generation facility 418 may receive voxelized representation 416 and use it to generate a mesh representation 420 of the hair. A model post-processing facility 422 may then receive mesh representation 420 and use it to generate a 3D hair model 424 that is output by hair model generation facility 410. At that point in the pipeline, a model integration facility 426 may receive 3D hair model 424 and a 3D body model 428 and may combine these to form the integrated 3D model 404 of the human subject. It will be understood that the entire hair reconstruction pipeline illustrated in FIG. 4 may be performed by any suitable computing resources as may serve a particular implementation. In some examples, some or all of the facilities of implementation 400 may be assisted with GPU acceleration for fast processing or other such enhancements.

Each of the facilities and the datasets produced thereby will now be described in more detail with reference to FIG. 4, as well as with reference to FIGS. 5-9, as indicated by parenthetical notations in FIG. 4. Specifically, for example, 2D imagery 402 will be described with reference to FIG. 5, hair orientation image 408 will be described with reference to FIG. 6, machine learning model 412 will be described with reference to FIG. 7, and so forth. In this way, the entire pipeline of implementation 400 of system 100 will be described and illustrated with reference to an extended example involving particular 2D imagery depicting a particular human subject (e.g., one of human subjects 312) who has a particular hairstyle. It will be understood that this extended example is provided for purposes of illustration only, and that there may be various other aspects of the process (e.g., aspects that may not be applicable to the particular hairstyle or particular characteristics and circumstances described for the extended example, etc.) that would be relevant to and appropriately handled for other examples (e.g., other hairstyles, other types of 2D images, other types of machine learning models, other system configurations involving other facilities or differently-ordered facilities, etc.).

2D imagery 402 may be implemented by any suitable image that depicts a human subject having hair that is to be modeled by way of methods and systems described herein. For example, in certain cases, 2D imagery 402 may be a photograph that depicts a person (e.g., a profile shot, a group photo, etc.) and that is either captured using an image capture device or is otherwise obtained (e.g., from an image database, from the Internet, etc.). In other cases, 2D imagery 402 may include one or more 2D image frames included in a frame sequence of 2D images frames (e.g., frames of a video clip or movie segment that depicts one or more people including the particular subject). In such examples, system 100 may perform method 200 for 2D imagery 402 as part of a continuous process in which method 200 is being performed for many or all of the 2D image frames of the frame sequence (e.g., for every frame of the video). For example, along with performing method 200 for a first frame of 2D imagery 402, system 100 may also 1) generate, based on an additional 2D image frame that is subsequent in the frame sequence to the first 2D image frame, an additional hair orientation image; 2) generate based on 3D hair model 424 of the hair (described in more detail below) and the additional hair orientation image, an updated 3D model of the hair of the human subject; and 3) update, based on the updated 3D model of the hair, the integrated 3D model 404 of the human subject formed by the integrating of 3D hair model 424 with 3D body model 428 (all of which will also be described in more detail below).

Figure 5:
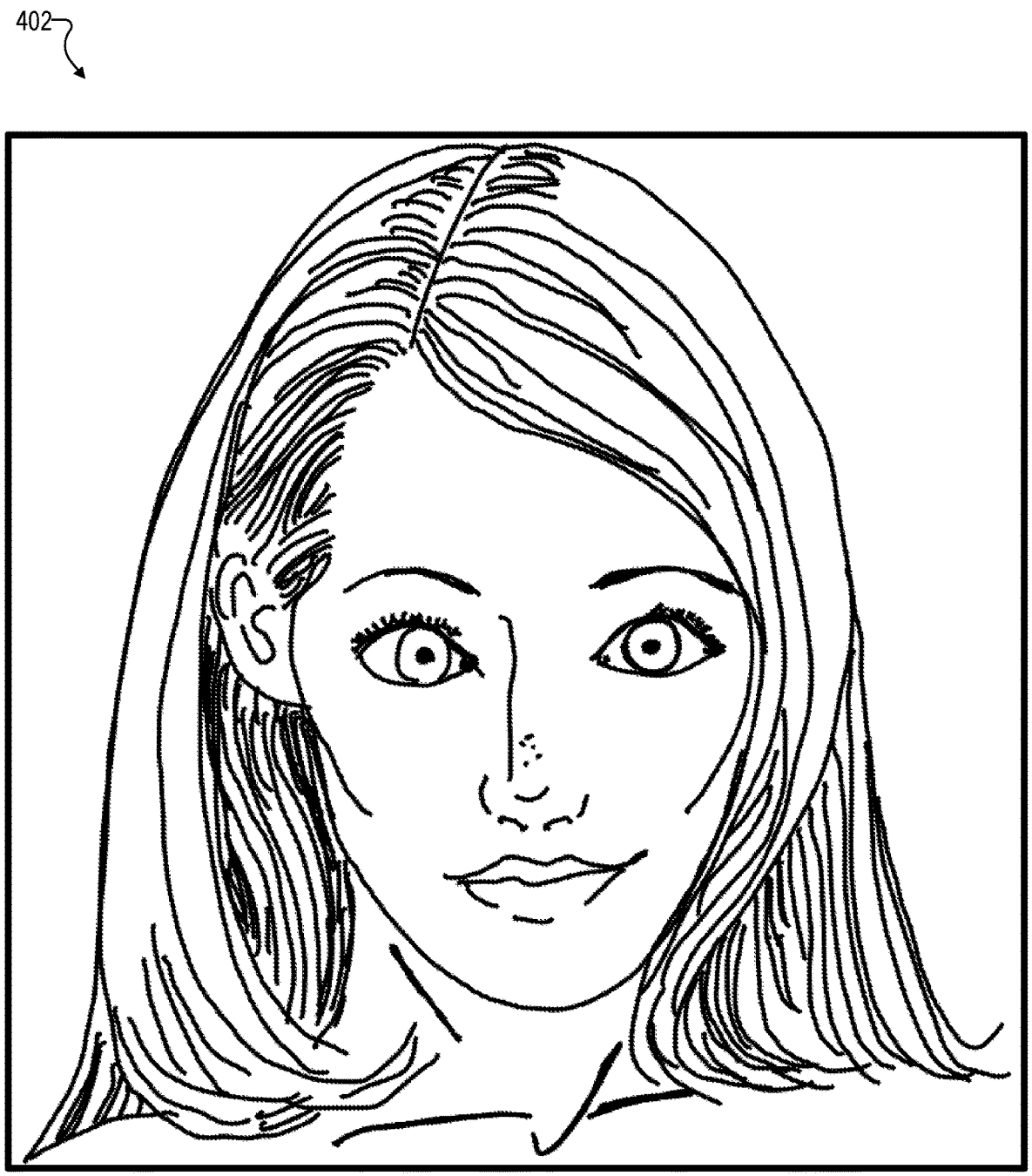
FIG. 5 shows an illustrative 2D image of a human subject having hair.

FIG. 5 shows an illustrative implementation of 2D imagery 402. As shown, this example 2D image 402 depicts a profile of a human subject having hair (i.e., a woman with shoulder length hair in a hairstyle having a straight part on the head, different portions of hair flowing in different directions, etc.). As mentioned above, 2D image 402 may represent a photograph captured by a camera (e.g., one of image capture device 310-1 or 310-2 described above), one or more frames of a video captured by a video camera, an image that a user such as user 306 has stored on graphics presentation device 304 or accesses from the Internet or a photo database, or any other 2D imagery as may serve a particular implementation. Because the representation of 2D imagery 402 illustrated in FIG. 5 shows a single 2D image depicting the human subject, this image is also referred to herein as "2D image 402," though it will be understood that 2D image 402 may represent any of the plurality of images or frames as have been described.

While 2D image 402 shows the human subject only from the neck up so as to show certain details of the hair of the subject for illustration purposes, it will be understood that the remainder of the human subject not shown in FIG. 5 (i.e., the body and clothing of the person from the neck down) may be depicted in certain implementations of 2D image 402 and/or may be available to a 3D modeling system responsible for generating the 3D model of the subject's body (e.g., system 100 or another 3D modeling system, as described in more detail below in relation to 3D body model 428). As another example, the 2D image 402 shown in FIG. 5 may represent a single frame of a 2D frame sequence (e.g., a video) that captures this closeup of the subject's face and hair, and that later pulls back to capture the subject from other vantage points (including wider vantage points configured to capture the entire body of the subject).

While examples described herein presuppose that a single 2D image 402 is used as input to system 100 (since as few as one 2D image may be sufficient to generate the 3D models in certain implementations), it will be understood that more than one 2D image of the same human subject (e.g., from a variety of different vantage points, etc.) may be useful to model the subject and his/her hair with more detail, accuracy, and so forth. As such, while FIG. 5 shows a single 2D image 402, it will be understood that 2D image 402 may, in certain examples, be implemented by multiple 2D images that all depict the same human subject (e.g., at different times from the same vantage point, at the same time from different vantage points, etc.).

Returning to FIG. 4, 2D image 402 is shown to be received by system 100, and by hair orientation generation facility 406 in particular. Based on 2D image 402, hair orientation generation facility 406 may generate a hair orientation image such as the hair orientation image 408 illustrated in FIG. 6.

Figure 6:
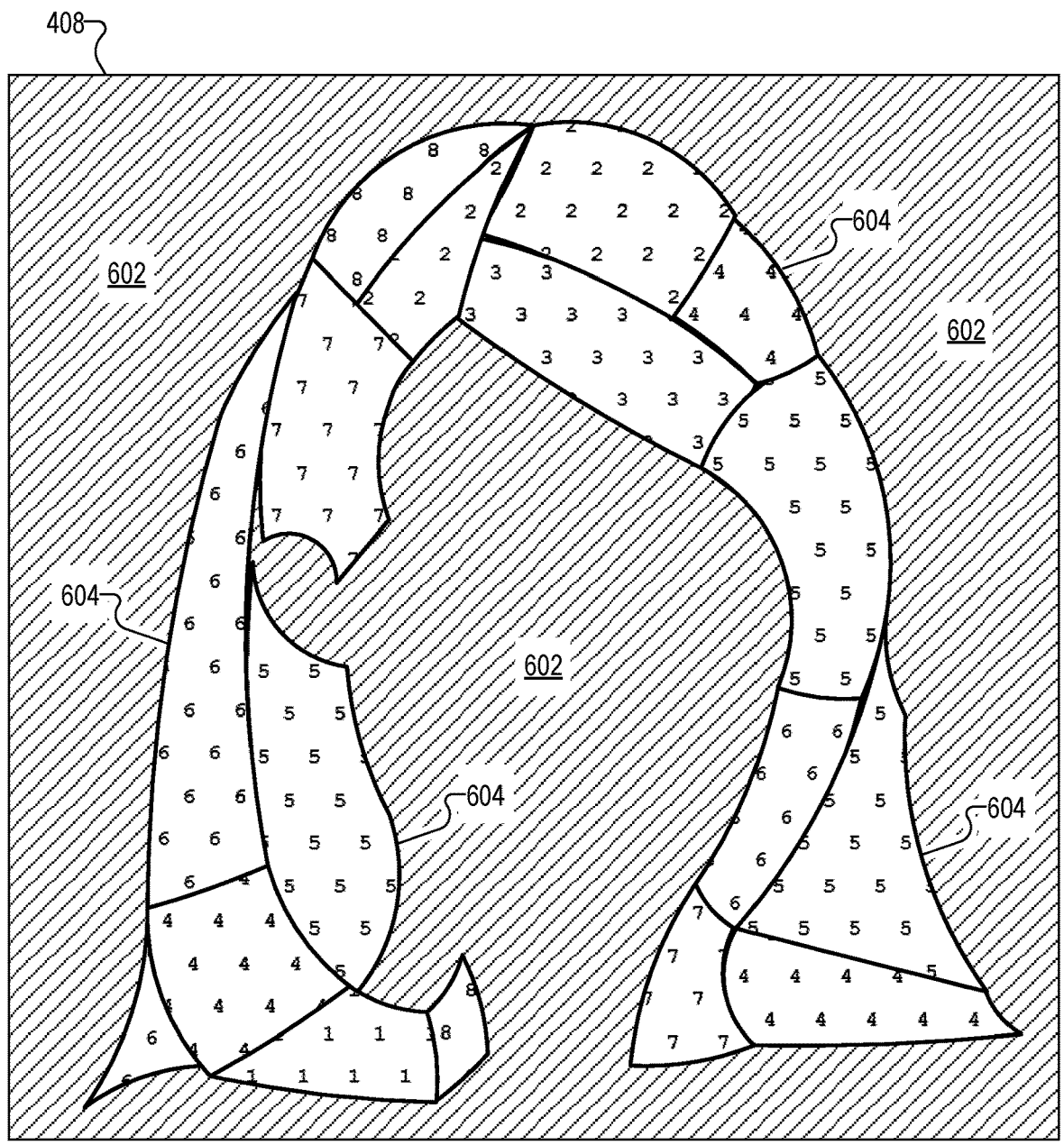
FIG. 6 shows an illustrative hair orientation image generated based on the 2D image of FIG. 5.
Figure 6:
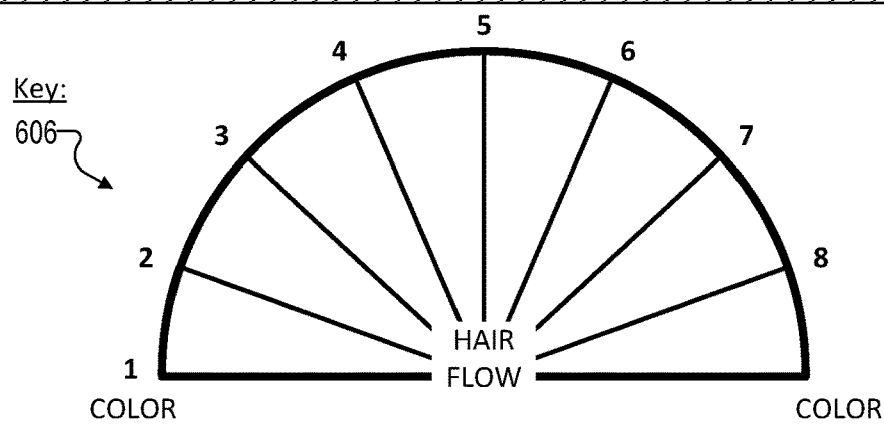

FIG. 6 shows an illustrative hair orientation image generated based on 2D image 402 (as was illustrated in FIG. 5). Just as 2D image 402 may be made up of a plurality of image elements such as pixels, groupings of pixels, or the like, hair orientation image may similarly be made up of a plurality of image elements that correspond to the image elements of 2D image 402 in a one-to-one manner. As such, the hair orientation image 408 illustrated in FIG. 6 is shown to be the same size, aspect ratio, and so forth as the 2D image 402 illustrated in FIG. 5 to indicate that these images each include the same number and orientation (e.g., rows, columns, etc.) of image elements. However, whereas 2D image 402 depicted the human subject herself (presumably with pixels colored to indicate the appearance of the subject, her hair, the background around her, etc.), the various image elements of hair orientation image 408 may represent different types of information.

Specifically, for instance, each of the plurality of image elements of hair orientation image 408 may indicate semantic segmentation data representing whether the image element depicts the hair of the human subject or content other than the hair. For example, image elements of 2D image 402 that depicted the subject's face and neck, as well as the background behind the subject, are shown to be shaded out in regions 602 of hair orientation image 408. All of these image elements (e.g., pixels in certain examples) are shown to be shaded to represent that they are unrelated to the hair of the subject that is to be modeled. Accordingly, these image elements may be designated by hair orientation generation facility 406 to be irrelevant to the hair modeling (e.g., by having a semantic segmentation value of false or '0' or the like) when hair orientation image 408 is generated.

For the rest of the image elements that do depict part of the subject's hair (for each image element indicated by the semantic segmentation data to depict the hair), unshaded regions of hair orientation image 408 labeled as regions 604 are shown to be characterized by fields of digits (1-8) that will be understood, in this example, to represent hair flow data for these image elements. Hair flow data may indicate, with respect to a 2D coordinate space of hair orientation image 408, a flow direction of the hair depicted by each image element in regions 604. For example, as shown by a key 606 near the bottom of FIG. 6, digits '1' may represent hair that flows approximately horizontally with respect to the 2D coordinate space of hair orientation image 408 (i.e., parallel to the top and bottom of the image or at 0° or 180°), digits '5' may represent hair that flows approximately vertically with respect to the 2D coordinate space (i.e., parallel to the sides of the image or at 90°), and other digits ('2'-'4' and '6'-'8') may represent other flow directions between the horizontal and vertical as indicated by key 606 (i.e., at angles that are neither parallel to the sides or top and bottom of the image).

While, for illustrative purposes, a relatively small number of different digits are shown in FIG. 6 and relatively large groupings of pixels are shown to share a single digit (e.g., large regions 604 that are all demarcated with flow data '5' or '6', etc.), it will be understood that, in certain implementations, a spectrum of hundreds or more different values may be available to indicate hair flow direction with a great deal of nuance. Moreover, other than illustrative convenience, there is no reason that image elements necessarily need to be grouped with one hair flow value as shown in FIG. 6. To the contrary, each pixel in a lineup of pixels may have progressively different values so that hair flowing in one direction may be indicated to more gradually shift to flowing in another direction (if that is indeed what the depicted hair does).

Though hair flow data may be represented for each image element in any suitable way (e.g., numbers associated with each image element and stored as metadata attached to hair orientation image 408, etc.), one convenient way of representing different flow directions for certain image formats may be to leverage the color values associated with each image element (e.g., red (R), green (G), and/or blue (B) values associated with each pixel in an example using an "RGB" image format, etc.). More specifically, for example, the plurality of image elements making up hair orientation image 408 may be pixels making up the hair orientation image, and the hair flow data for each of the pixels making up the hair orientation image (i.e., the pixels in regions 604) may indicate the flow direction of the hair depicted by the pixel based on a color attribute of the pixel. Key 606 indicates that digits 1-8 may represent colors (e.g., a very light red color at '1' to a very dark red color at '8'; a pure red color at '1' to various shades of orange, yellow, green, and eventually a pure blue color at '8'; etc.) for this type of implementation. Though actual color is not shown in the line drawing of FIG. 6, it may be understood that the different fields of digits in hair orientation image 408 may be colored in accordance with one of these color schemes rather than filled with the digits.

In some examples, an image element that is assigned a black color or a white color may be deemed to not be depicting the hair. For example, a black or white pixel may be interpreted as having semantic segmentation data indicating that the pixel depicts content other than the hair (as shown for all the pixels in regions 602). In contrast, an image element that is assigned a non-black and/or non-white color may be deemed to be depicting hair that flows in a direction indicated by the specific shade of the image element. For example, a non-black and non-white pixel (e.g., a pixel colored with a certain shade of red, for instance) may be interpreted as having semantic segmentation data indicating that the pixel depicts hair of the subject that flows in a particular direction indicated by the specific color (e.g., the specific shade of red in this example). In this way, hair orientation image 408 may be formatted, stored, encoded, compressed, transmitted, and otherwise treated like any standard 2D image, though both semantic segmentation data and hair flow data for each image element is encoded therein. Additionally, while individual pixels are described for various examples given herein, it will be understood that groupings of pixels (e.g., 2×2 blocks of 4 pixels, 3×3 blocks of 9 pixels, 4×4 blocks of 16 pixels, etc.) or other types pixel groupings or image elements may be employed for implementations in which, for various reasons, it is either unnecessary or undesirable to process and store individual semantic segmentation data and hair flow data for every single pixel of 2D image 402.

Returning to FIG. 4, the generating of 3D hair model 424 by hair model generation facility 410 may be based on a machine learning model customized for hair modeling (illustrated in FIG. 4 as machine learning model 412). As such, hair model generation facility 410 is shown to take as input both hair orientation image 408 and machine learning model 412. In certain implementations, machine learning model 412 may be generated by system 100 itself (e.g., by facilities separate from those of the pipeline facilities illustrated in FIG. 4). In other implementations, machine learning model 412 may be generated by a separate computing system and may be accessed by system 100.

Figure 7:
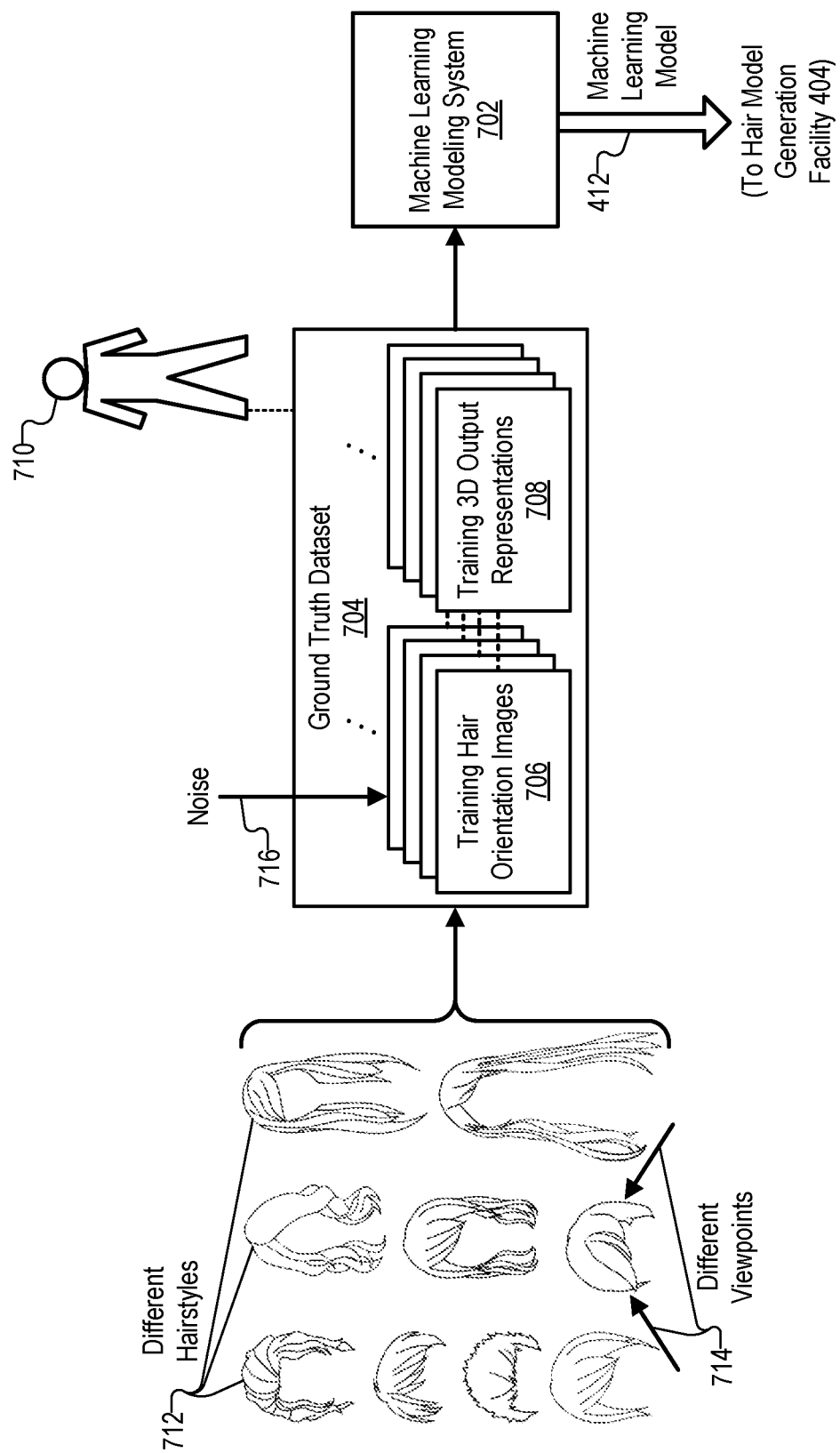
FIG. 7 shows illustrative aspects of how a machine learning model may be generated for use by a 3D modeling system to model a human subject having hair based on 2D imagery.

Whether implemented inside or outside of system 100, FIG. 7 shows illustrative aspects of how machine learning model 412 may be generated for use by system 100 (and by the facilities of hair model generation facility 410 in particular) to model a human subject having hair (e.g., the woman depicted in 2D image 402 illustrated in FIG. 5).

As shown in FIG. 7, machine learning model 412 may be generated by a machine learning modeling system 702 that trains machine learning model 412 using a ground truth dataset 704 that includes a set of training hair orientation images 706 and a set of training 3D output representations 708 (e.g., a set of training voxelized representations, a set of mesh representations, etc.). As illustrated by dotted lines, each 3D output representation 708 may correspond to at least one particular training hair orientation images 706. Machine learning model 412 may be pretrained using this ground truth dataset 704 by, for example, using training hair orientation image 706 as training inputs and using corresponding training 3D output representations 708 as training outputs. More specifically, using ground truth dataset 704, machine learning model 412 may be pretrained to reconstruct 3D output representations 708 from training hair orientation images 706 (e.g., 2D images similar to hair orientation image 408 described above). This pre-trained model may then be deployed to enable a fast hair model reconstruction with the aid of GPU acceleration.

Machine learning modeling system 702 may employ any type of machine learning, deep learning, neural networking, artificial intelligence, or other such algorithms as may serve a particular implementation. For instance, machine learning modeling system 702 may generate machine learning model 412 to be a deep neural network involving a plurality of convolutional neural network (CNN) layers. This model may include an encoding component that encrypts the hair latent information from the input images (training hair orientation images 706) and a decoding component to reconstruct 3D hair volumetric fields for the output representations (3D output representations 708 implemented as voxelized or polygon mesh representations, rather than strand-based representations). In some examples, machine learning modeling system 702 may be based on established algorithms and/or technologies, but may be customized for hair-specific modeling (e.g., enabling the model to generate 3D output representations such as representations 708 based on hair orientation images such as images 706). For instance, certain parameters (e.g., how large or granular the CNN layers are set to be, how many CNN layers are used, etc.) may be optimized and/or fine-tuned for hair modeling as may serve a particular implementation.

Along with having a large number and variety of different training hair orientation images and corresponding training 3D output representations, ground truth dataset 704 may also be optimized and enhanced in various other respects.

As one example, ground truth dataset 704 may benefit from human oversight from one or more artists, programmers, machine learning experts, and/or other professionals. An artist 710 is shown in FIG. 7 to represent this type of oversight that humans may exercise over ground truth dataset 704 and the model training process. Artist 710 may select, for ground truth dataset 704, a wide variety of training hair orientation images 706 (e.g., representing different hairstyles, having different properties, captured from different vantage points, etc.). For each of these input images, artist 710 may also ensure that desirable, realistic, and human-scale 3D hair representations are prepared for use as the 3D output representations 708 in ground truth dataset 704.

As another example of how ground truth dataset 704 may be optimized to help train up an effective machine learning model 412, ground truth dataset 704 may be augmented to include, within the set of training hair orientation images 706, a first training hair orientation image representing a first hairstyle and a second training hair orientation image representing a second hairstyle distinct from the first hairstyle. Ground truth dataset 704 may also include, within the set of training 3D output representations 708, a first training 3D output representation corresponding to the first training hair orientation image and a second training 3D output representation corresponding to the second training hair orientation image. Indeed, as shown in FIG. 7, the training data included in ground truth dataset 704 may reflect a variety of different hairstyles 712 (e.g., as selected and managed under the oversight of artist 710). By utilizing such a variety of hairstyles 712 (e.g., hairstyles favored by different genders, hairstyles for different lengths of hair, hairstyles for different textures and/or types of hair, etc.) within ground truth dataset 704, a single machine learning model 412 generated and managed by machine learning modeling system 702 may be used to create a similarly large variety of different 3D hair models for the variety of human subjects that system 100 may encounter.

As yet another example of how ground truth dataset 704 may be optimized to help train up an effective machine learning model 412, ground truth dataset 704 may include, within the set of training hair orientation images 706, a first training hair orientation image 706 and a second training hair orientation image 706 that both represent a same particular hairstyle from different viewpoints (e.g., from different sides of the hair, from the front and the back, from above the hair and from a lower angle, etc.). Ground truth dataset 704 may also include, within the set of training 3D output representations 708, a single training 3D output representation 708 that corresponds to both the first training hair orientation image 706 and the second training hair orientation image 706. To illustrate, FIG. 7 shows two different viewpoints 714 of a single one of hairstyles 712. It will be understood that each of these viewpoints 714 may correspond to a different training hair orientation image 706, and that those two training hair orientation images 706 may both correspond to one training 3D output representation 708 within ground truth dataset 704.

Yet another way that ground truth dataset 704 may be optimized and enhanced is by way of various data processing techniques. These techniques may include hairstyle blending, hair spatial transitions, hair transformations, perspective projections of 3D hair data to 2D images at different viewpoints, noise additions to resemble natural data scenarios, and/or other suitable augmentations to the training data (e.g., as artist 710 may see fit to perform or as machine learning modeling system 702 may be configured to direct). In certain implementations, ground truth dataset 704 may be augmented to include noise 716 injected into one or more hair orientation images within the set of training hair orientation images 706. In this way, training hair orientation images 706 may be made to more realistically resemble natural human hair images that will be received and/or generated by system 100. Augmentations such as the inclusion of noise 716 may be used to increase the 3D hair data volume in order to improve the model learning capacities and to further enhance the variety of hairstyles covered by the training data.

As another data processing technique to improve ground truth dataset 704 (e.g., to optimize bias-variance tradeoff during model training, etc.), ground truth dataset 704 may be shuffled randomly and split into separate training and test datasets. Machine learning modeling system 702 may then train machine learning model 412 with the training dataset and evaluate machine learning model 412 with the separate testing dataset. This approach may help ensure that machine learning model 412 does not overfit during the model training process and that it achieves a robust 3D hair reconstruction performance during application.

Returning to FIG. 4, hair model generation facility 410 is shown to input hair orientation image 408 and, based on machine learning model 412, to generate 3D hair model 424. In certain examples, machine learning model 412 may generate 3D hair model 424 as a polygon mesh or other suitable model in a single step. In other examples such as illustrated in FIG. 4, however, it may be beneficial to generate 3D hair model 424 as a culmination of several different techniques performed progressively by different facilities such as those shown in hair model generation facility 410. For example, if the expected output format of 3D hair model 424 is a polygon mesh object, a series of data processing techniques such as voxelization, mesh generation, smoothing, noise treatment, and other post-processing may be progressively applied to the 3D hair data by the various facilities shown in hair model generation facility 410. As explicitly shown in FIG. 4, for instance, the generating of 3D hair model 424 may include: 1) generating, at voxel generation facility 414 and based on hair orientation image 408 and the machine learning model 412 pretrained using ground truth dataset 704 (as described above), voxelized representation 416 of the hair; 2) generating, at mesh generation facility 418 and based on voxelized representation 416, mesh representation 420; and 3) creating, at model post-processing facility 422 and based on mesh representation 420, the output 3D hair model 424.

Figure 8:
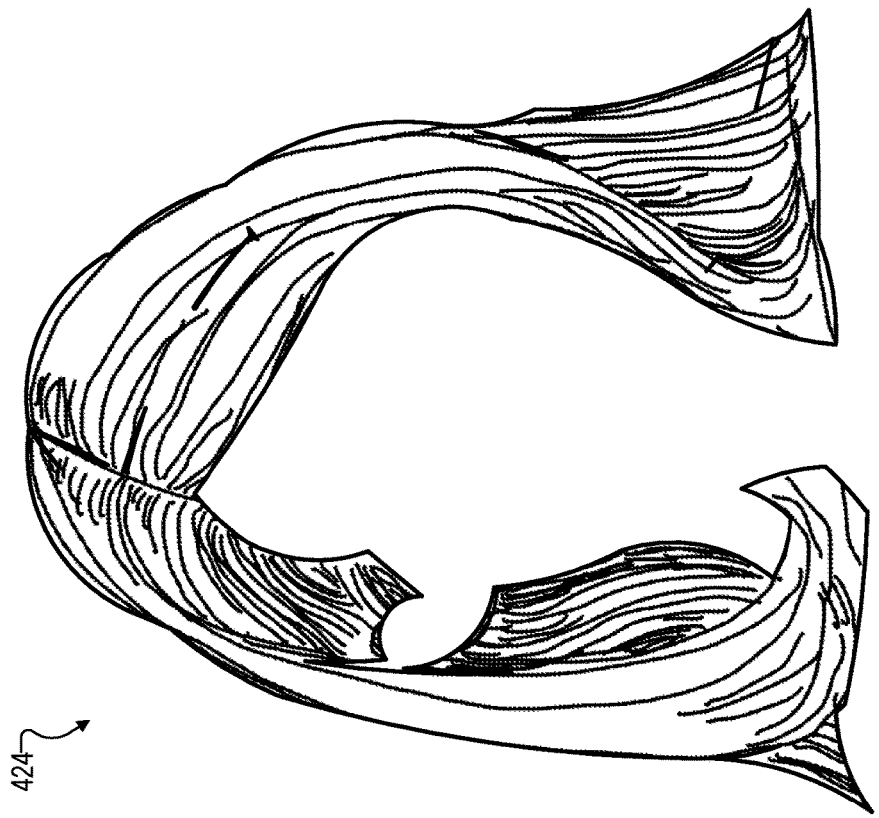
FIG. 8 shows illustrative representations and models of the hair of a human subject that are progressively generated by an illustrative 3D modeling system.
Figure 8:
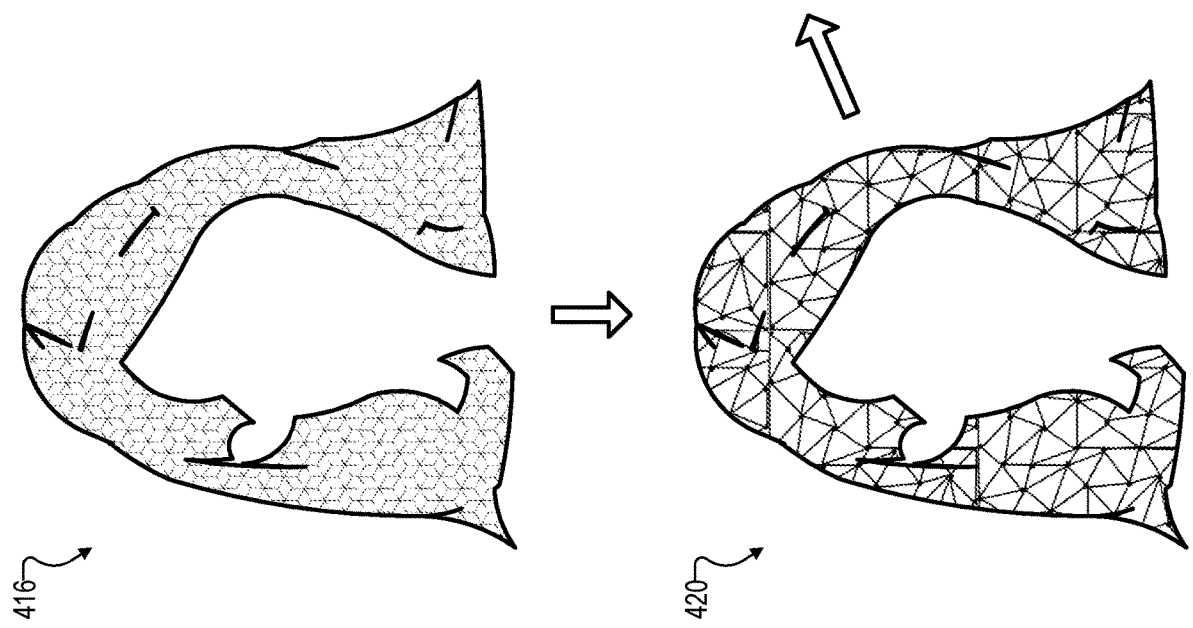

To illustrate each of these intermediate representations and the final output model, FIG. 8 shows illustrative representations and models of the hair of the human subject as progressively generated by hair model generation facility 410 based on hair orientation image 408 and machine learning model 412.

First, a depiction of voxelized representation 416 is drawn in the shape of the hairstyle of the human subject and with a blocky texture that will be understood to represent a plurality of voxels from which this 3D representation is constructed. The plurality of voxels in voxelized representation 416 may represent the hair of the human subject as determined by machine learning model 412 when hair orientation image 408 is provided as an input to the machine learning model. Voxelized representation 416 may be made up of voxels that are disposed in a 3D voxel space in a manner analogous to how pixels are disposed in a 2D image space. Accordingly, one datapoint that may be used to create and verify voxelized representation 416 is whether the voxels of voxelized representation 416, when observed from the same viewpoint as used for 2D image 402 and hair orientation image 408, give the same geometry and overall appearance (e.g., texture, etc.) as 2D image 402. This viewpoint is only one of many viewpoints that must be taken into account to generate an accurate 3D representation of the subject's hair, however. To account for accuracy from various other viewpoints, other hair orientation images of the same subject (if available) and/or training of machine learning model 412 (which may incorporate 3D information about the hair of people with similar hairstyles as the human subject of 2D image 402) may be employed. Each voxel in voxelized representation 416 may represent not only a geometrical location of where a portion of hair is located in the voxel space (i.e., position information), but may also be associated with any other suitable information about the voxel as may serve a particular implementation. For instance, along with the position information, voxels may further include color information, texture information, links to other voxels (which may be used to convert the linked voxels into the polygons of a polygonal mesh), and/or other information about other relevant properties or characteristics.

While voxelized representation 416 may be well-defined and readily manipulable within the 3D voxel space in which it exists, it may be desirable to convert voxelized representation 416 into a mesh representation in order to allow for further manipulation of the model outside of the specific voxel space and to make the model more manageable for storage and transmission. For instance, by converting voxelized representation 416 into a mesh representation, the model may be represented using less data and may be independently modified or altered, added to a scene, removed from a scene, moved or translated within a scene, reoriented or otherwise transformed within a scene, replicated, scaled, manipulated in connection with other mesh representations of other subjects (e.g., combined with other mesh representations such as a 3D model of the body of the human subject), and/or manipulated in any other way as may serve a particular implementation. Another benefit of generating an independently-manipulable mesh representation is that model may be more consistently represented from frame to frame in a frame sequence, resulting in a more stable and less jittery appearance.

For at least these reasons, hair model generation facility 410 (and mesh generation facility 418 in particular) may generate, based on voxelized representation 416, mesh representation 420 to include structure data representing a plurality of interconnected vertices and texture data corresponding to the structure data. As shown, a depiction of mesh representation 420 is drawn in the shape of the hairstyle of the human subject and with various triangles (i.e., interconnected vertices) that will be understood to represent the polygons of a polygonal mesh (e.g., a textured mesh in certain examples, though the texture data is not explicitly illustrated in FIG. 8). The plurality of interconnected vertices may form polygons such as triangles and texture data (e.g., color information, etc.) for each such triangle may be associated with mesh representation 420 such that the overall data structure represents the hair of the human subject in the format of a textured mesh. While a triangle mesh is shown in FIG. 8, it will be understood that other geometric shapes such as quadrilaterals could be used in addition or as an alternative to the triangles of mesh representation 420.

FIG. 8 shows the final 3D hair model 424 being generated based on mesh representation 420. For example, 3D hair model 424 may likewise be a textured mesh representation (like mesh representation 420), but may undergo suitable postprocessing and finishing techniques (e.g., smoothing, noise reduction, color adjustments, etc.) to prepare the model for combination with the body model for presentation. As shown, 3D hair model 424 may have the appearance of the hair of the human subject depicted in 2D image 402 when viewed from the same viewpoint (as shown in FIG. 8). However, unlike that 2D image, it will be understood that 3D hair model 424 is a 3D representation that may be independently manipulated in 3D space (e.g., added to the space, removed from the space, translated or transformed within the space, etc.) and viewed from any viewpoint as a user may desire.

Returning to FIG. 4, model integration facility 426 may be configured to access (e.g., receive) 3D hair model 424 from hair model generation facility 410 and to access 3D body model 428 from another part of system 100 or from a separate 3D modeling system configured to model the rest of the body other than the hair being modeled by system 100. Upon accessing these models, model integration facility 426 may combine the models to generate integrated 3D model 404, which may represent a 3D model of the entire human subject (the hair plus the rest of the body).

As part of this integrating of the models, model integration facility 426 may be configured to prepare the hair and body models in various ways and then attach the prepared hair model to the head of the body model. This preparation may involve, for example, properly scaling 3D hair model 424 to accord with the size of 3D body model 428, spatially transforming either of the models (e.g., using translations, rotations, etc.), optimizing colors and textures of the models in various ways to ensure that they will fit together with a unified look and feel, and/or performing other operations aimed at ultimately facilitating a natural-looking integrated model representing both body and hair of the human subject.

In some examples, the hair and body models may be positioned, oriented, and posed so that the 3D composite model (i.e., integrated 3D model 404), when projected from the same angle as the original 2D image 402, will look like 2D image 402. In this way, 2D image 402 may serve as a known reference point whereby the output of model integration facility 426, integrated 3D model 404, may be validated. Moreover, in examples where multiple 2D images depicting the human subject from different viewpoints are available, each of these may be used to validate potential ways of integrating the models by projecting prospective integrated models from viewpoints or perspectives associated with the original 2D images and checking for agreement between the projections and the original 2D images.

Just as machine learning may be used in the generation of 3D hair model 424 (e.g., by creating voxelized representation 416 based on hair orientation image 408 as described in relation to FIG. 7, etc.), machine learning models and technologies may also be useful to model integration facility 426 for effectively integrating 3D hair model 424 and 3D body model 428. For example, an artist-supervised ground truth dataset analogous to ground truth dataset 704 may be used to train a machine learning system by providing various hair models and body models as training input and providing corresponding integrated 3D models of human subject (e.g., 3D models that are well-proportioned and optimized according to desirable criteria set by an artist, etc.) as training output.

Model integration facility 426 may integrate 3D hair model 424 with 3D body model 428 by attaching the hair to the body in a rigid manner that allows the hair to coherently follow body motions during animations or other manipulations of the integrated model. For example, if the hairstyle of 3D hair model 424 is a relatively short and/or rigid (non-flowing) style, the hair in this type of example may remain rigidly fixed in place regardless of how the integrated model is animated or otherwise manipulated. Similarly, the hair may be given a limited range of motion to give the appearance of a few strands of hair swaying naturally with motion while the hairstyle as a whole stays generally fixed in place.

For other examples, such as for hairstyles of 3D hair model 424 that are relatively long and/or free-flowing (e.g., a pony tail, long hair that is free to move with motion of the head, etc.), the hair model may be attached to the body model at a single point, but, just as the body model has joints to allow different body parts to be posed in different ways (e.g., elbows and knees may bend, torso and neck may twist, etc.), so too the hair model may be configured with joints to allow for more degrees of freedom for simulating natural motion of different parts of the hair. More particularly, for instance, integrated 3D model 404 may comprise a set of joints each joining at least two parts from a set of parts making up the human subject, and this set of joints may include: 1) a plurality of body joints that join parts of 3D body model 428; 2) one or more hair joints that join parts of 3D hair model 424; and 3) a single joint that joins 3D hair model 424 and 3D body model 428.

Figure 9:
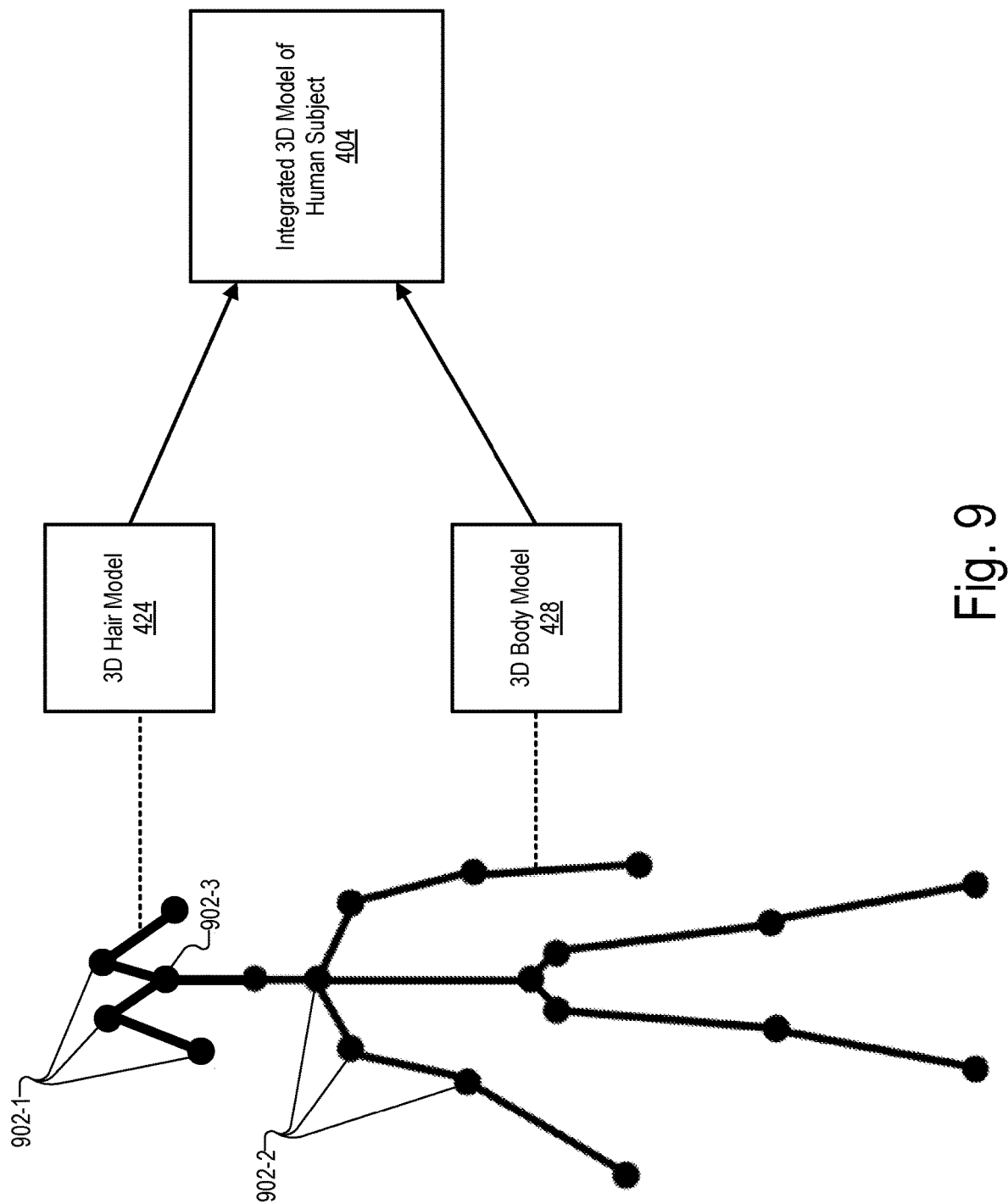
FIG. 9 shows illustrative aspects of how multi-joint 3D models may be combined to form an integrated 3D model of a human subject.

To illustrate, FIG. 9 shows illustrative aspects of how multi-joint 3D models may be combined to form an integrated 3D model of a human subject. As shown, a set of joints 902 is composed of a subset of joints 902-1 incorporated into 3D hair model 424, a subset of joints 902-2 incorporated into 3D body model 428, and a single joint 902-3 that joins 3D hair model 424 and 3D body model 428 so as to generate integrated 3D model 404 of the human subject.

Joints 902-1 of the hair model may allow the relatively long and unconstrained hairstyle of the human subject in this example to have several degrees of freedom as may be appropriate when the integrated model is used in a particular application (e.g., as the model is animated to perform actions such as running or dancing, as the model is inserted into an environment in which virtual wind is blowing, etc.). Similarly, joints 902-2 of the body model may allow the body to take on a variety of different poses that may be applied to the model in connection with whatever use case the model is used for. Throughout all of this motion, joint 902-3 may keep the hair model rigidly fixed to the top of the subject's head in a proper orientation, with the proper scale, and so forth.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 10:
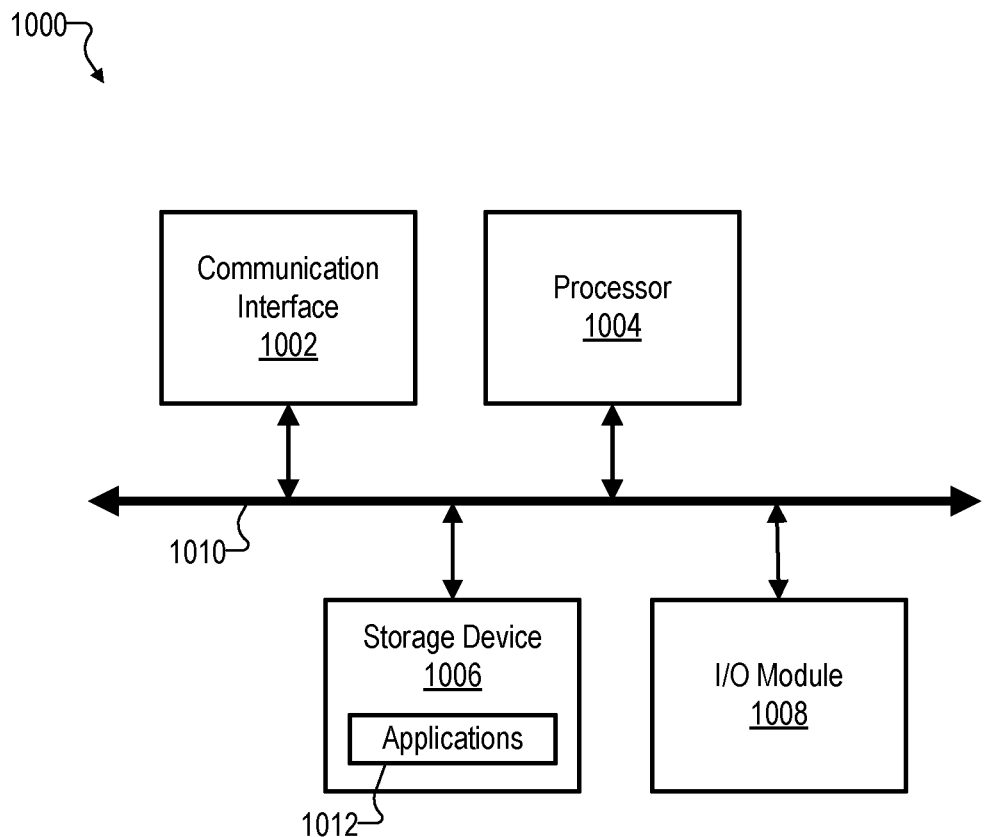
FIG. 10 shows an illustrative computing device that may implement 3D modeling systems and/or other computing systems described herein.

FIG. 10 shows an illustrative computing device 1000 that may implement 3D modeling systems and/or other computing systems described herein. For example, computing device 1000 may include or implement (or partially implement) a 3D modeling system 100, a multi-access compute system such as multi-access compute system 302, a user device such as graphics presentation device 304, certain elements of network 308 and/or image capture devices 310, any other computing devices or systems described herein, and/or any elements or subsystems thereof.

As shown in FIG. 10, computing device 1000 may include a communication interface 1002, a processor 1004, a storage device 1006, and an input/output (I/O) module 1008 communicatively connected via a communication infrastructure 1010. While an illustrative computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with processor 104 of system 100. Likewise, memory 102 of system 100 may be implemented by or within storage device 1006.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   generating, by a 3D modeling system and based on a 2D image depicting a human subject having hair, a hair orientation image made up of a plurality of image elements, the hair orientation image including:
      for each of the plurality of image elements, semantic segmentation data indicating whether the image element depicts the hair of the human subject or content other than the hair, and
      for each image element indicated by the semantic segmentation data to depict the hair, hair flow data indicating, with respect to a 2D coordinate space of the hair orientation image, a flow direction of the hair depicted by the image element;
   generating, by the 3D modeling system and based on the hair orientation image, a 3D model of the hair of the human subject, wherein the generating the 3D model of the hair of the human subject includes:
      converting the hair orientation image into a voxelized representation of the hair by providing the hair orientation image as input into a model configured to generate voxelized representations;
      converting the voxelized representation of the hair into a mesh representation of the hair; and
      converting the mesh representation of the hair into the 3D model of the hair of the human subject; and
   integrating, by the 3D modeling system, the 3D model of the hair of the human subject with a 3D model of a body of the human subject.

2. The method of claim 1, wherein:
   the 2D image depicting the human subject having hair is a 2D image frame included in a frame sequence of 2D images frames; and
   the method further comprises:
      generating, by the 3D modeling system and based on an additional 2D image frame subsequent to the 2D image frame in the frame sequence, an additional hair orientation image,
      generating, by the 3D modeling system and based on the 3D model of the hair and the additional hair orientation image, an updated 3D model of the hair of the human subject, and
      updating, by the 3D modeling system and based on the updated 3D model of the hair, an integrated 3D model of the human subject formed by the integrating of the 3D model of the hair with the 3D model of the body.

3. The method of claim 1, wherein:
   an integrated 3D model of the human subject is formed by the integrating of the 3D model of the hair with the 3D model of the body; and
   the method further comprises animating, by the 3D modeling system and based on an animation of an additional human subject different from the human subject, the integrated 3D model of the human subject to mimic the animation of the additional human subject.

4. The method of claim 1, wherein:
   the plurality of image elements making up the hair orientation image are pixels making up the hair orientation image; and the hair flow data for each of the pixels making up the hair orientation image indicates the flow direction of the hair depicted by the pixel based on a color attribute of the pixel.

5. The method of claim 1, wherein:
the generating of the 3D model of the hair is further based on a machine learning model customized for hair modeling; and
the machine learning model is pretrained using a ground truth dataset including a set of training hair orientation images and a set of training 3D output representations corresponding to the set of training hair orientation images.

6. The method of claim 5, wherein the ground truth dataset used to pretrain the machine learning model includes:
within the set of training hair orientation images, a first training hair orientation image representing a first hairstyle and a second training hair orientation image representing a second hairstyle distinct from the first hairstyle; and
within the set of training 3D output representations, a first training 3D output representation corresponding to the first training hair orientation image and a second training 3D output representation corresponding to the second training hair orientation image.

7. The method of claim 5, wherein the ground truth dataset used to pretrain the machine learning model includes noise injected into the set of training hair orientation images.

8. The method of claim 5, wherein the ground truth dataset used to pretrain the machine learning model includes:
within the set of training hair orientation images, a first training hair orientation image and a second training hair orientation image that both represent a same particular hairstyle from different viewpoints; and
within the set of training 3D output representations, a single training 3D output representation corresponding to both the first training hair orientation image and the second training hair orientation image.

9. The method of claim 1, wherein:
an integrated 3D model of the human subject is formed by the integrating of the 3D model of the hair with the 3D model of the body; and
the integrated 3D model comprises a set of joints each joining at least two parts from a set of parts making up the human subject, the set of joints including:
a plurality of body joints that join parts of the 3D model of the body,
one or more hair joints that join parts of the 3D model of the hair, and
a single joint that joins the 3D model of the hair and the 3D model of the body.

10. The method of claim 1, wherein the generating the 3D model of the hair is further based on a machine learning model pretrained using a ground truth dataset including a set of training hair orientation images and a set of mesh representations corresponding to the set of training hair orientation images.

11. A system comprising:
a memory storing instructions; and
a processor communicatively coupled to the memory and configured to execute the instructions to:
generate, based on a 2D image depicting a human subject having hair, a hair orientation image made up of a plurality of image elements, the hair orientation image including:
for each of the plurality of image elements, semantic segmentation data indicating whether the image element depicts the hair of the human subject or content other than the hair, and
for each image element indicated by the semantic segmentation data to depict the hair, hair flow data indicating, with respect to a 2D coordinate space of the hair orientation image, a flow direction of the hair depicted by the image element;
generate, based on the hair orientation image, a 3D model of the hair of the human subject, wherein the generating the 3D model of the hair of the human subject includes:
converting the hair orientation image into a voxelized representation of the hair by providing the hair orientation image as input into a model configured to generate voxelized representations;
converting the voxelized representation of the hair into a mesh representation of the hair; and
converting the mesh representation of the hair into the 3D model of the hair of the human subject; and
integrate the 3D model of the hair of the human subject with a 3D model of a body of the human subject.

12. The system of claim 11, wherein:
the 2D image depicting the human subject having hair is a 2D image frame included in a frame sequence of 2D images frames; and
the processor is further configured to execute the instructions to:
generate, based on an additional 2D image frame subsequent to the 2D image frame in the frame sequence, an additional hair orientation image,
generate, based on the 3D model of the hair and the additional hair orientation image, an updated 3D model of the hair of the human subject, and
update, based on the updated 3D model of the hair, an integrated 3D model of the human subject formed by the integrating of the 3D model of the hair with the 3D model of the body.

13. The system of claim 11, wherein:
an integrated 3D model of the human subject is formed by the integrating of the 3D model of the hair with the 3D model of the body; and
the processor is further configured to execute the instructions to animate, based on an animation of an additional human subject different from the human subject, the integrated 3D model of the human subject to mimic the animation of the additional human subject.

14. The system of claim 11, wherein:
the plurality of image elements making up the hair orientation image are pixels making up the hair orientation image; and
the hair flow data for each of the pixels making up the hair orientation image indicates the flow direction of the hair depicted by the pixel based on a color attribute of the pixel.

15. The system of claim 11, wherein:
the generating of the 3D model of the hair is further based on a machine learning model customized for hair modeling; and
the machine learning model is pretrained using a ground truth dataset including a set of training hair orientation images and a set of training 3D output representations corresponding to the set of training hair orientation images.

16. The system of claim 15, wherein the ground truth dataset used to pretrain the machine learning model includes:
- within the set of training hair orientation images, a first training hair orientation image representing a first hairstyle and a second training hair orientation image representing a second hairstyle distinct from the first hairstyle; and
- within the set of training 3D output representations, a first training 3D output representation corresponding to the first training hair orientation image and a second training 3D output representation corresponding to the second training hair orientation image.

17. The system of claim 15, wherein the ground truth dataset used to pretrain the machine learning model includes noise injected into the set of training hair orientation images.

18. The system of claim 15, wherein the ground truth dataset used to pretrain the machine learning model includes:
- within the set of training hair orientation images, a first training hair orientation image and a second training hair orientation image that both represent a same particular hairstyle from different viewpoints; and
- within the set of training 3D output representations, a single training 3D output representation corresponding to both the first training hair orientation image and the second training hair orientation image.

19. The system of claim 11, wherein the generating the 3D model of the hair is further based on a machine learning model pretrained using a ground truth dataset including a set of training hair orientation images and a set of mesh representations corresponding to the set of training hair orientation images.

20. A non-transitory computer-readable medium storing instructions that, when executed, direct a processor of a computing device to:
- generate, based on a 2D image depicting a human subject having hair, a hair orientation image made up of a plurality of image elements, the hair orientation image including:
  - for each of the plurality of image elements, semantic segmentation data indicating whether the image element depicts the hair of the human subject or content other than the hair, and
  - for each image element indicated by the semantic segmentation data to depict the hair, hair flow data indicating, with respect to a 2D coordinate space of the hair orientation image, a flow direction of the hair depicted by the image element;
- generate, based on the hair orientation image, a 3D model of the hair of the human subject, wherein the generating the 3D model of the hair of the human subject includes:
  - converting the hair orientation image into a voxelized representation of the hair by providing the hair orientation image as input into a model configured to generate voxelized representations;
  - converting the voxelized representation of the hair into a mesh representation of the hair; and
  - converting the mesh representation of the hair into the 3D model of the hair of the human subject; and
- integrate the 3D model of the hair of the human subject with a 3D model of a body of the human subject.

\* \* \* \* \*